W. T. WILLIE.
Machine for Distributing Compounds for Destroying Cotton-Worms.
No. 160,986. Patented March 16, 1875.
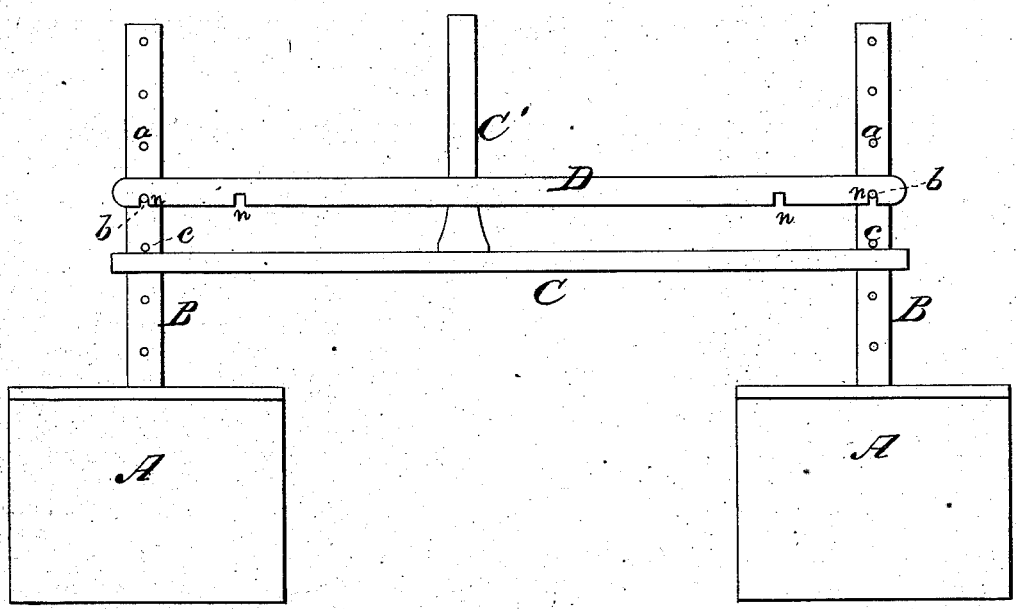
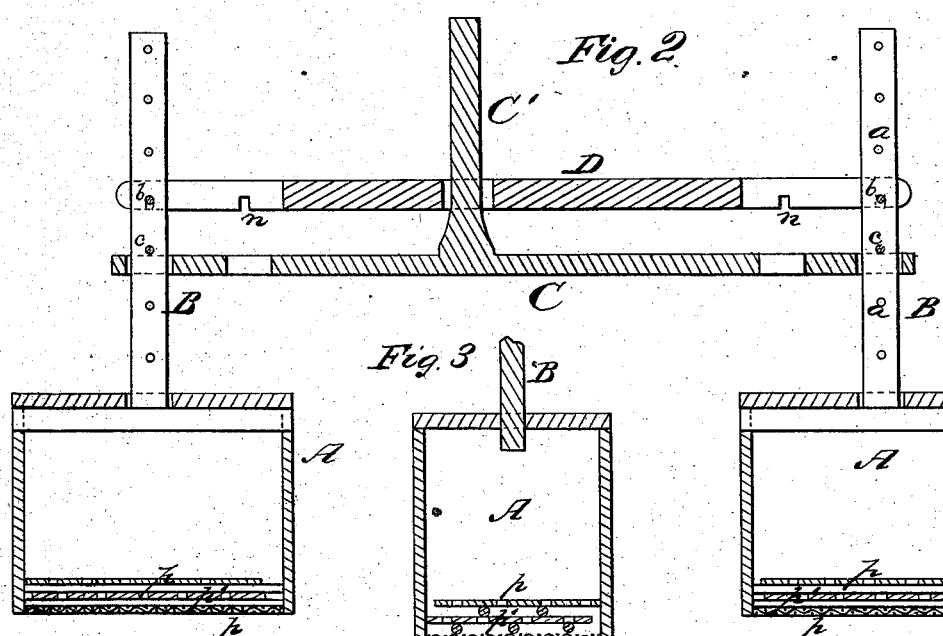
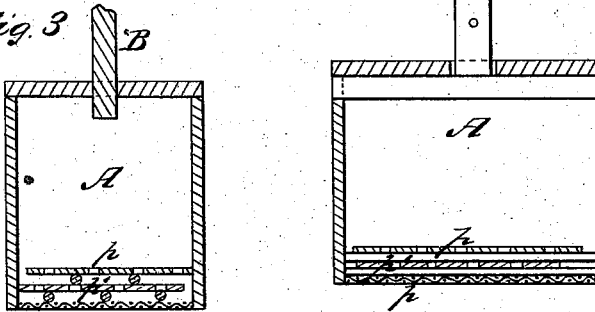
WITNESSES
Mary J. Utley
Geo. E. Upham
INVENTOR
William T. Willie
BY Chipman Hosmer & Co
ATTORNEYS

UNITED STATES PATENT OFFICE.

WILLIAM T. WILLIE, OF BRENHAM, TEXAS, ASSIGNOR OF ONE-HALF HIS RIGHT TO WILLIAM H. THACKER.

IMPROVEMENT IN MACHINES FOR DISTRIBUTING COMPOUNDS FOR DESTROYING COTTON-WORMS.

Specification forming part of Letters Patent No. 160,986, dated March 16, 1875; application filed March 6, 1875.

*To all whom it may concern:*

Be it known that I, WILLIAM T. WILLIE, of Brenham, in the county of Washington and State of Texas, have invented a new and valuable Improvement in Machines for Distributing Cotton-Worm Poisons; and I do hereby declare that the following is a full, clear, and exact description of the construction and operation of the same, reference being had to the annexed drawings, making a part of this specification, and to the letters and figures of reference marked thereon.

Figure 1 of the drawing is a representation of a front view of my machine, and Fig. 2 is a sectional view of the same. Fig. 3 is a detail view.

This invention has relation to machines which are designed for scattering the various poison-powders used for destroying the cotton-worm and other vermin destructive to plants. It consists in the employment of vibrating sifting-boxes, in combination with a suspension-bar which is adapted to be secured across the front part of the saddle of a horse, and to allow the rider to vibrate the said boxes, and thus discharge the poison-powder upon two rows of plants at the same time, as will be more fully explained hereinafter.

In the annexed drawings, A A designate two boxes of any suitable capacity, which are constructed with two fixed sieves, $p$ $p$, and movable sieves $p'$, arranged between the fixed sieves and supported upon rods, so as to slide freely when the boxes are vibrated, and aid in pulverizing the material, and at the same time scattering it uniformly. The upper sieves $p$ will support the bulk of the material free from the scattering-sieves $p'$. Each box has secured to it a suspension-standard, B, having a number of holes, $a$, through it, arranged one above another, and adapted to receive suspension-pins $b$ $c$, and allow the boxes to be adjusted vertically for high or low plants. C designates a bar, from which rises a guide-rod, $C'$. This bar C is intended to be secured by the middle of its length to a riding-saddle in front of the rider, and through its ends holes are made, through which the standards B B are passed, and sustained by means of the pins $c$ $c$. Supplemental holes are made through the bar C, to allow the boxes A A to be adjusted for rows of plants varying in width. D designates a bar, the ends of which are slotted longitudinally to receive the standards B B, and at or near the middle of the length of this bar D a hole is made to receive freely through it the rod $C'$. The ends of bar D are notched at $n$, and are attached to the standards B B by fitting these notches over the pins $b$ $b$, as shown in Figs. 1 and 2.

The machine thus described is operated while the horse is traveling between the rows of plants by giving endwise motion to the bar D, which will communicate vibrating motions to the sifting-boxes and scatter the powder over the plants.

What I claim as new, and desire to secure by Letters Patent, is—

1. The boxes A A, suspended, by means of standards B B and pins $c$ $c$, from a cross-bar, C, which is adapted for being secured to a riding-saddle, in combination with the actuating-bar D, substantially as described.

2. The boxes A A, suspended as described, and made vertically and laterally adjustable, for the purpose set forth.

In testimony that I claim the above I have hereunto subscribed my name in the presence of two witnesses.

WILLIAM THOMAS WILLIE.

Witnesses:
    R. D. HARRIS,
    I. S. YOUNG.